(No Model.)

B. T. HENRY.
AXLE BOX.

No. 397,721. Patented Feb. 12, 1889.

Witnesses:
Chas. B. Shumway
C. L. Swan Jr.

Inventor,
B. Tyler Henry
By Geo. D. Seymour
Atty.

N. PETERS, Photo-Lithographer, Washington, D. C.

UNITED STATES PATENT OFFICE.

BENJAMIN TYLER HENRY, OF NEW HAVEN, CONNECTICUT.

AXLE-BOX.

SPECIFICATION forming part of Letters Patent No. 397,721, dated February 12, 1889.

Application filed May 22, 1888. Serial No. 274,711. (No model.)

*To all whom it may concern:*

Be it known that I, BENJAMIN TYLER HENRY, residing at New Haven, in the county of New Haven and State of Connecticut, have invented certain new and useful Improvements in Axles; and I do declare the following to be a full, clear, and exact description of the same, reference being had to the accompanying drawings, which form a part of this specification.

My invention relates to an improvement in axles, the object being to provide simple and efficient means for taking up the endwise wear therein, for preventing damage thereto, and for excluding foreign matter from the wearing-surfaces thereof.

With these ends in view my invention consists in an extension-nut adapted in itself to be retained in its adjustments upon the end of the box and to be turned from its periphery and provided in its outer end with an annular recess; in an axle-box having its end threaded in one direction and an axle-nipple threaded in the opposite direction, when combined with my improved extension-nut, and in an axle having a retaining-chamber and an intercepting-passage formed at its rear end and adapted to intercept and retain all foreign matter gaining access from the said end of the box.

Figure 1:
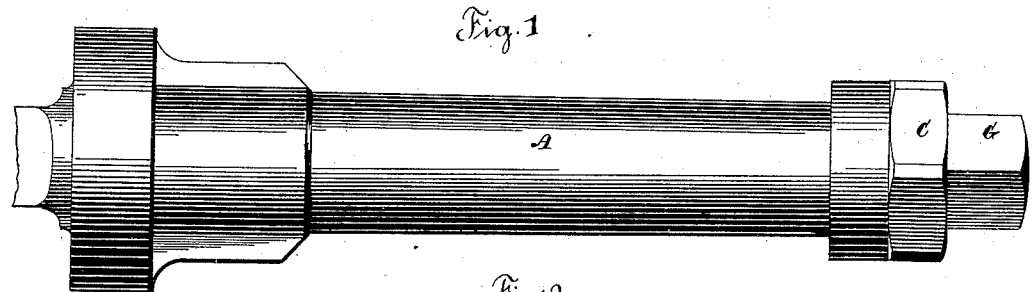
Figure 2:
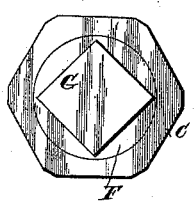
Figure 3:
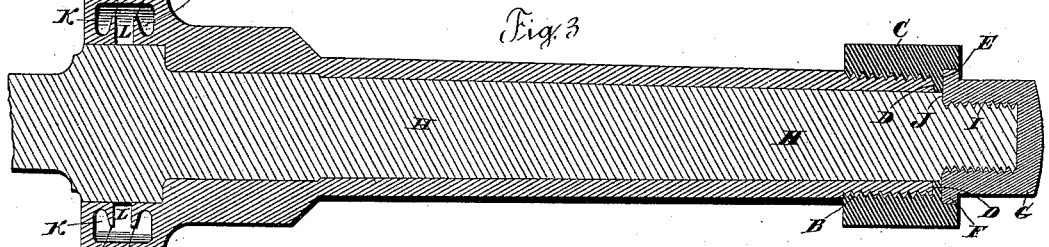
Figure 4:
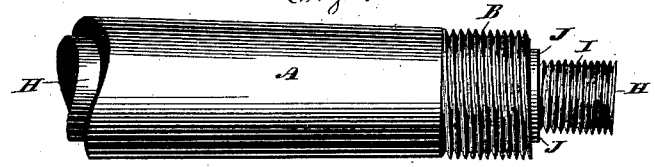
Figure 5:
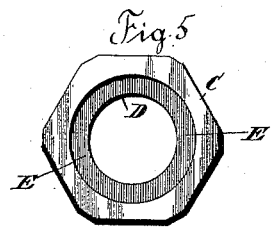
Figure 6:
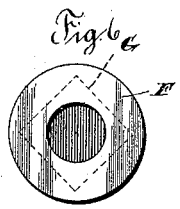

In the accompanying drawings, Figure 1 is a view in side elevation of an axle embodying my invention. Fig. 2 is a view in elevation of the outer end thereof. Fig. 3 is a view of the axle in central longitudinal section. Fig. 4 is a broken view in side elevation with the extension-nut removed from the axle-box and the nipple-nut removed from the axle-arm to show that one has a right-hand thread and the other a left-hand thread. Fig. 5 is a detached view of the extension-nut, and Fig. 6 is a similar view of the nipple-nut.

The outer or smaller end of the axle-box A is provided with right-hand screw-threads B to receive an adjustable extension-nut, C, having its inner end interiorly threaded and fitted upon the box, so as to be held in place thereupon solely by the friction between its threads and those of the box. The nut is peripherally faced to adapt it to be turned by any ordinary wrench. A shoulder, D, formed upon the inside of the nut, abuts, when the axle is new, against the outer end of the axle-box, to which the bore of the nut conforms, so that the nut virtually forms an extension of the bore of the box. The outer end of the nut is provided with a circular recess, E, adapted to receive a circular flange, F, formed at the inner end of the nipple-nut G and fitting into such recess, so as to be just flush with the outer face of the said extension-nut. The inner wall of this recess runs against the adjacent face of the said flange. The said nipple-nut screws onto a nipple having a left-hand thread, I, and formed at the outer end of the axle-arm H, which is provided at the inner end of the said nipple with a narrow shoulder, J, as shown.

The inner end of the axle-box is provided, as herein shown, with an annular retaining-chamber, K, concentric with its bore, with an annular radial intercepting-passage, L, leading from the bore of the box into such chamber, and with two flanges, M, projecting outward into the chamber from its inner end and arranged so as to close the outer end of the passage to the inner portion of the chamber, whereby anything once introduced into the chamber is retained therein by the said flanges until the chamber is filled above their edges.

To adjust my improvement for taking up wear, a wrench is applied to the faced extension-nut, which is then turned so as to lenghten the axle-box sufficiently to compensate for all wear and slightly moving the shoulder D away from the end of the box. This does not require the removal of either of the nuts or any special tools, but only an ordinary wrench to turn the extension-nut with. By fitting the extension-nut so as to be retained in place solely by the friction between its threads and those of the box an extremely simple construction is secured, and one admitting of the adjustment of the axle without the removal of any of its parts and without the use of washers between the extension-nut and the end of the axle-box. By threading the end of the axle-box and the nipple in opposite directions damage from the sticking together or binding of the nuts is prevented, because such construction compels their separation when the wheel is started. The formation of a recess in the nipple-nut to receive the flange of the nipple is a construction eminently well adapted for excluding water or grit from the running-surfaces of the device.

In case any foreign matter, be it fluid or solid, water or grit, makes an entrance at the inner end of the axle between the box and the arm, such will be intercepted by the intercepting-passage in the box and deflected into the retaining-chamber, and so prevented from working forward, where it is not wanted. The whole amount of matter intercepted in this way will of course be small, and practically the chamber will never fill beyond its safe retaining capacity; but it may be cleaned out, if that be demanded, when the box is removed from the axle-arm.

I am aware that United States Patent No. 218,275, of August 5, 1879, granted to Henry Jones and now vested solely in me by mesne assignments, shows and broadly claims an extensible axle-box having its outer end threaded to receive an adjustable cap, against which the nipple-nut bears. I do not, therefore, broadly claim an extensible axle-box or an axle-box having its outer end threaded to receive an adjustable cap, but only the specific improvement particularly pointed out and claimed herein.

Having fully described my invention, what I claim as new, and desire to secure by Letters Patent, is—

1. The combination, with an axle-box having its outer end threaded, of an extension-nut mounted upon such threaded end of the box, fitted so as to be held in any adjustment thereupon solely by the friction between its threads and those of the same and adapted to be turned from its periphery, an axle-arm having a threaded nipple, and a nipple-nut screwing over such nipple and bearing against the outer end of the extension-nut, whereby the said extension-nut may be adjusted to take up the wear without the removal of either of the nuts or the use of washers, substantially as set forth.

2. The combination, with an axle-box having its outer end threaded, of an extension-nut mounted upon such threaded end of the box, fitted so as to be held in any adjustment thereupon solely by the friction between its threads and those of the box, an axle-arm having its nipple threaded in an opposite direction from the threads on the axle-box, and a nipple-nut screwing over such nipple and bearing against the outer end of the extension-nut, whereby the said extension-nut may be adjusted without the removal of either of the nuts or the use of washers, and whereby and owing to the opposite threading of the box and nipple damage is prevented in case the nuts should get bound together, substantially as set forth.

3. The combination, with an axle-box having its outer end threaded, of an extension-nut mounted upon such threaded end of the box, fitted so as to be held in any adjustment thereupon solely by the friction between its threads and those of the same, having a circular recess in its outer end and adapted to be turned from its periphery, an axle-arm having a threaded nipple, and a nipple-nut screwing over such nipple and having at its inner end a flange adapted to enter the circular recess in the extension-nut, whereby the said extension-nut may be adjusted to take up wear without the removal of either of the nuts or the use of washers, and whereby, also, dust is excluded from the wearing-surfaces of the device, substantially as set forth.

4. An axle-box the inner end whereof is provided with an annular retaining-chamber, an annular intercepting-passage leading from the bore of the box into such chamber, and one or more flanges located within the chamber and closing the said passage to the inner portion thereof, whereby foreign matter gaining access to the box is intercepted by the said passage and thence conveyed to the chamber, where it is retained, substantially as set forth.

In testimony whereof I have signed this specification in the presence of two subscribing witnesses.

B. TYLER HENRY.

Witnesses:
 CHAS. B. SHUMWAY,
 C. L. SWAN, Jr.